United States Patent [19]

Stookey

[11] Patent Number: 4,687,578

[45] Date of Patent: Aug. 18, 1987

[54] FLUID SEPARATION MEMBRANES

[75] Inventor: Donald J. Stookey, Creve Coeur, Mo.

[73] Assignee: Monsanto Company, St. Louis, Mo.

[21] Appl. No.: 807,928

[22] Filed: Dec. 12, 1985

[51] Int. Cl.$^4$ ............................................. G01D 13/00
[52] U.S. Cl. .................................. 210/321.1; 55/158; 210/500.23; 210/640
[58] Field of Search ............ 210/640, 314, 316, 433.2, 210/321.1, 500.23; 55/16, 158

[56] References Cited

U.S. PATENT DOCUMENTS

| | | | |
|---|---|---|---|
| 2,833,415 | 5/1958 | Wilkinson | 210/DIG. 13 X |
| 2,930,754 | 3/1960 | Stuckey | 210/640 X |
| 3,127,341 | 3/1964 | Abeles | 210/DIG. 13 X |
| 3,228,877 | 1/1966 | Mahon | 210/22 |
| 3,370,708 | 2/1968 | Hultgren et al. | 210/130 |
| 3,503,515 | 3/1970 | Tomsic | 210/321.1 |
| 4,098,698 | 7/1978 | Lamothe | 210/316 X |
| 4,234,428 | 11/1980 | Schnell | 210/314 X |

Primary Examiner—Frank Spear
Attorney, Agent, or Firm—H. Croskell

[57] ABSTRACT

Fluid separation membranes and modules containing the separation membranes are disclosed wherein the membranes have preselected portions having lower selectivity to the feed fluid mixture; thus permitting the fluid feed mixtures to permeate the membranes in controlled amounts for purposes of sweeping selected permeate fluid away from the non-feed membrane surface.

12 Claims, 4 Drawing Figures

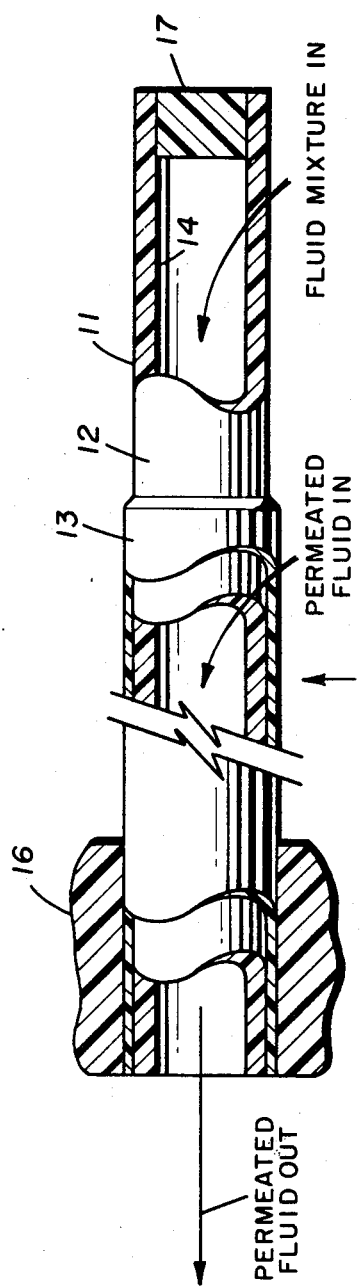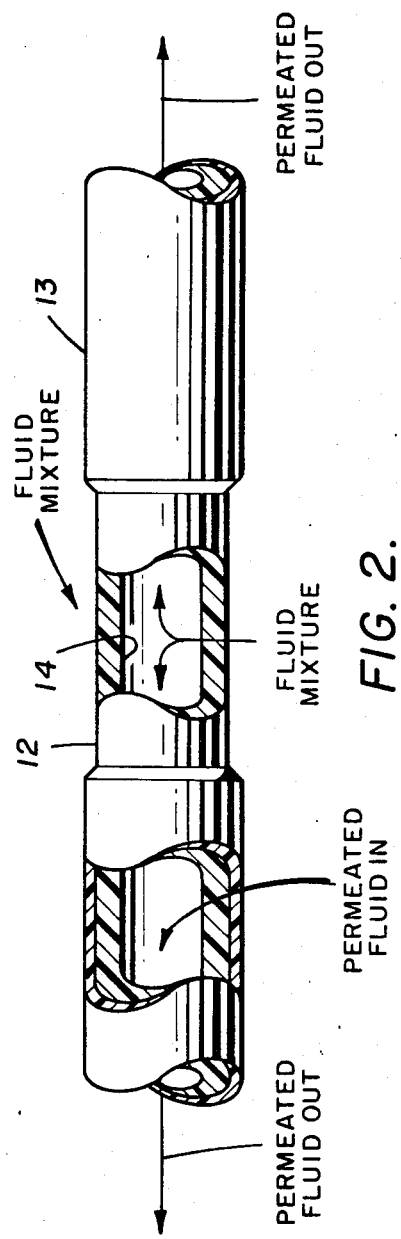

FLUID SEPARATION MEMBRANES

BACKGROUND OF THE INVENTION

1. Field of the Invention

This invention relates to fluid separation membranes. In another aspect, the invention relates to a fluid separation module.

2. Prior Art

It is known to separate one fluid from a mixture of fluids by using a membrane which is more permeable to the one fluid than the others of the mixture. The fluid mixtures are brought into contact with one side of the membrane, with a pressure differential being maintained across the membrane, and the permeable fluid will permeate the membrane to the other side thereof and thereby become separated from the fluid mixture.

The rate of permeation of the fluid through a membrane is a function of the difference in partial pressures of the fluid on opposite sides of the membrane. If these partial pressures are the same, none of the fluid will permeate the membrane. This presents a real problem when it is desired to treat a fluid mixture containing only very small amounts of the fluid to be separated from the mixture. For example, when it is desired to dehydrate ethanol containing one to two percent water, the permeation of only a small portion of the water will result in a water vapor partial pressure on the permeate side of the membrane equivalent to that on the feed side, so that no more water will permeate the membrane. One method of solving this problem is to use a sweep fluid which carries the permeated fluid away from the permeate side of the membrane to allow more of such fluid to permeate the membrane.

U.S. Pat. No. 3,536,611 discloses a membrane device which uses a sweep stream to sweep a permeated fluid from a bundle of membrane tubes through which the fluid has permeated. The sweep streams are brought in from opposite ends of the bundle of tubes and it is obvious that exterior piping, valves, etc. are required for directing the sweep streams into the device.

U.S. Pat. No. 3,499,062 discloses fluid separation apparatus in which part of a feed stream to be treated is passed through a membrane separator for sweeping out fluids which permeate the membranes of the separator. The least complicated embodiment of this apparatus is shown in FIGS. 6 and 9. Various piping and valves are used for directing the sweep stream into the separation apparatus. Such piping and valving, which must be used with any of the known separation apparatus where a sweep fluid is required, add to the cost and complexity of the system.

SUMMARY OF THE INVENTION

A membrane for separating one fluid from a mixture of such one fluid and at least one other fluid, the membrane preferably being in the form of a hollow fiber having one end thereof open and the other end thereof closed and also having a predetermined separation factor for the one fluid over the other fluid such that when the fluid mixture is brought under pressure into contact with the exterior surface of the membrane, the one fluid permeates the membrane to the interior thereof. At a point remote from the open end of the hollow fiber membrane, the membrane is provided with a portion having a reduced separation factor to allow passage of some of the fluid mixture through this portion into the interior of the fiber to sweep out permeated fluid from the interior of the fiber.

DESCRIPTION OF THE DRAWINGS

FIG. 1 is a greatly enlarged, fragmentary view of the hollow fiber membrane of this invention.

FIG. 2 is a greatly enlarged, fragmentary view of a hollow fiber membrane making up a second embodiment of this invention.

DETAILED DESCRIPTION OF THE INVENTION

Figure 3:
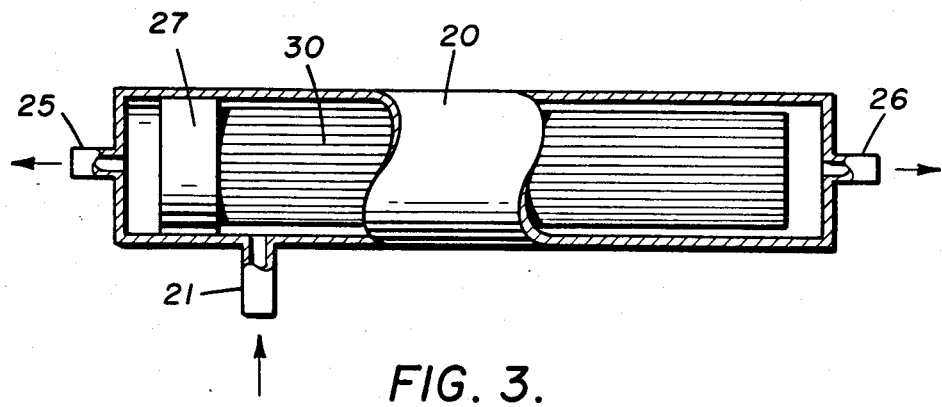
FIG. 3 is a schematic, cross-sectional view showing a fluid separation module using the hollow fiber membranes shown in FIG. 1.

Referring now in detail to the drawings, there is shown in FIG. 1 a hollow fiber membrane 11 made up of a porous substrate 12 made from a known polymeric material and a coating 13, the substrate 12 having a central bore 14. The substrate 12 supports the thin coating 13 which exhibits a predetermined separation factor for one fluid relative to another fluid and is thus the part of the membrane which carries out the separation. The substrate 12, being porous, does not assist materially in the separation. This separation factor is such that when the fluid mixture is brought into contact with the outer surface of the coating 13, under pressure, the one fluid will permeate the membrane to the bore 14 in significantly greater amounts than the other fluid of the mixture, depending upon the separation ratio for the two fluids.

One end of the fiber 11 is open and extends through a tube sheet 16 which, when the fiber is mounted in a cylindrical shell, will prevent fluids from the mixture from flowing from the shell past the tube sheet 16. The other end of the fiber 11 is closed. This may be done by inserting a plug 17 into the bore 14 or by cutting this end of the fiber with a hot wire.

A small portion of the fiber adjacent to the closed end is left uncoated when the coating 13 is applied to the substrate 12.

The purpose of providing the membrane of FIG. 1 with an uncoated end portion is to reduce the separation factor of this apportion to allow more of the non-permeating fluid to flow into this portion. Thus, for a given surface area the total fluid flow rate into the uncoated portion is greater than the fluid flow rate into the coated part of the membrane. This extra amount of fluid flows into the uncoated portion of the membrane to the open end thereof, thus serving as a sweeping gas.

Many polymeric materials are known to be suitable for making a membrane which will separate one fluid from others in a mixture. The most efficient membranes are those in the form of hollow fibers, for the reason that much more effective surface area can be packed into a given volume. Generally, a bundle of hollow fiber membranes is positioned in a cylindrical shell and the gas mixture to be treated is brought into the shell surrounding the fiber bundle under appropriate pressure. The more permeable fluid of the mixture permeates the wall of the hollow fiber membrane to the bore thereof and is withdrawn from the bore at one end of the fiber. The amount of the more permeable fluid with the less permeable fluid exiting from the bore of the fiber 11 will be determined by the separation factor of the fiber for the two fluids. For this reason, the polymeric material from which the fiber 11 is made and the process of making the fiber 11 are usually selected to give the highest practical separation factor for the fluids to be separated.

In the hollow fiber membrane shown in FIG. 2, the uncoated portion of the membrane is at or near the midpoint of the membrane and both ends of the membrane are open. Thus, the sweep fluid enters this membrane at or near the midpoint thereof and flows toward the ends to sweep out fluids permeating the membrane through the coated portions thereof.

FIG. 3 schematically shows apparatus which is used when the membrane shown in FIG. 1 is to be used. This apparatus consists of a cylindrical shell 20 having an inlet opening 21 and outlet openings 25 and 26. A cylindrical tube sheet 27 is positioned in the shell 20 near one end thereof. A bundle 30 of hollow fiber membranes such as disclosed in FIG. 1 is positioned in the shell, with the membranes extending to the tube sheet 27. The ends of the fibers remote from the tube sheet 27 are sealed. The membranes are provided with uncoated portions near the sealed ends such as shown in FIG. 1. A mixture of fluids to be separated flows into the shell 20 through the inlet 21 and passes through the fiber bundle 30 and then out of the shell 20 through the outlet line 26.

The more permeable fluid of the mixture will permeate the hollow fibers to the bores thereof and then flow along these bores through the tube sheet 27 and out of the cylindrical shell 20 through the outlet line 25. The uncoated ends of the fibers in the bundle 30 near the outlet line 26 allow a greater amount of fluid to enter the fiber to flow along the bore of the fiber and sweep out the fluid permeated by the coated portion of the fiber.

Figure 4:
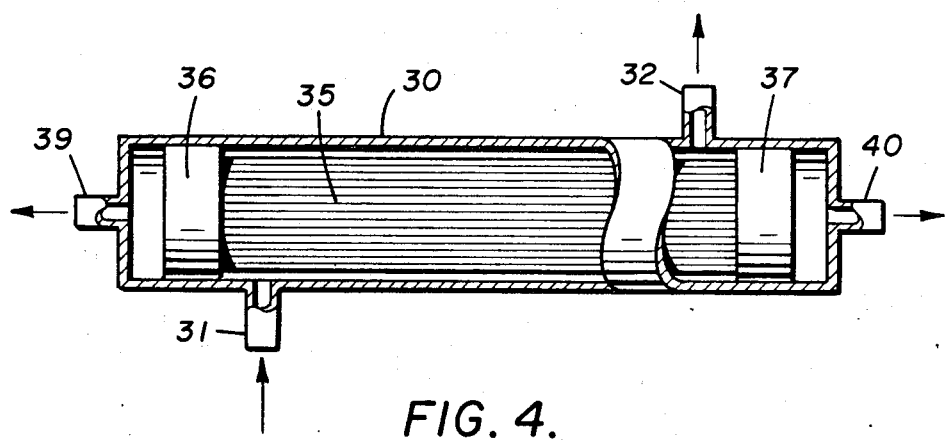
FIG. 4 is a cross-sectional, schematic view showing a fluid separation module using the hollow fiber membranes shown in FIG. 2.

FIG. 4 is a schematic drawing showing apparatus to be used with the fiber shown in FIG. 2. In this embodiment, a cylindrical shell 30 is provided with an inlet 31 and an outlet 32 for flow of the fluid mixture to be separated. A bundle 35 of hollow fiber membranes such as shown in FIG. 2 is positioned in the shell, with the ends of the fibers extending through tube sheets 36 and 37 positioned at opposite ends of the shell 30. The more permeable of the fluids to be separated will permeate the fibers and then flow out through the fibers through the tube sheets 36 and 37 and then out of the shell 30 through outlet lines 39 and 40. The uncoated portions of the fibers at or near the midpoints thereof allow more of the fluid mixture to flow into the fiber bore and then flow in opposite directions out of the fibers to sweep out that fluid which permeates the coated portion of the fiber.

In the embodiment described above, the sweep fluid is allowed to flow into the fiber bore through an uncoated portion of the fiber. It should be understood, however, that other methods may be used for admitting the sweep fluid to the bore of the fiber. For example, it is also possible to use a fiber which has no coating but which has been treated in some manner, as by a surface treatment, to form a dense layer on the outer surface of the fiber, with the surface treatment not being applied to a portion of the fiber in order to cause this portion to have a higher fluid flow rate than the remainder of the fiber. Also, it is possible to increase the fluid flow rate through a portion of the fiber by treatment of that portion with an appropriate agent. For example, a portion of a polysulfone substrate having a polydimethyl siloxane coating may be exposed to a high level of carbon dioxide to cause that portion to have a reduced separation factor. It is also possible to use a fiber with a partially closed end opening, where the end opening is controlled to admit the desired amount of sweep gas.

We claim:

1. A membrane for separating one fluid from a mixture of said one fluid and at least one other fluid, said membrane having opposite sides and a predetermined separation factor for said one fluid relative to said other fluid such that when the fluid mixture is brought under pressure into contact with one side of the membrane, more of said one fluid will permeate to the other side of the membrane, said membrane having a portion adapted to allow more of said other fluid to pass through the membrane to sweep said one fluid out of the vicinity of said other side.

2. The membrane of claim 1 wherein the membrane is in the form of a hollow fiber.

3. The membrane of claim 2 wherein the hollow fiber has both ends open and said portion is near the midpoint of the fiber.

4. The membrane of claim 2 wherein the hollow fiber has both ends open and said portion is near an open end of the fiber.

5. The membrane of claim 4 wherein said other fluid sweep and the fluid mixture feed flow concurrently.

6. The membrane of claim 4 wherein said other fluid sweep and the fluid mixture feed flow co-currently.

7. The membrane of claim 1 wherein the membrane is made from a polymeric material.

8. The membrane of claim 2 wherein one closed end of the fiber has a partially closed portion to allow flow of the predetermined amount of the fluid mixture into said interior.

9. The membrane of claim 3 wherein the membrane is made up of a porous support layer and a coating supported by the porous support layer.

10. The membrane of claim 9 wherein said coating does not cover said portion.

11. A fluid separation module comprising:
  a. a generally cylindrical shell;
  b. a tube sheet positioned in the shell at one end thereof, said tube sheet being sealed to the shell to prevent the flow of fluids around the tube sheet;
  c. a bundle of hollow fiber membranes positioned in the shell and extending through the tube sheet, said membranes having a predetermined separation factor for one fluid with respect to another fluid;
  d. said shell having an inlet for feeding a mixture of said fluids under pressure into said shell to contact the outer surfaces of said membranes to allow said one fluid to permeate the membranes to the interiors thereof; and
  e. said membranes each having at a point remote from the tube sheet a portion adapted to allow more of said fluid mixture to pass through said portion to the interiors of the fibers, said portion being of sufficient length that the amount of said mixture passing through said portion is sufficient to sweep the permeated one fluid from the interior of said fiber.

12. A fluid separation module comprising:
  a. a generally cylindrical shell;
  b. tube sheets positioned in the shell at a first and second end thereof, said tube sheets being sealed to the shell to prevent the flow of fluids around the tube sheets;

c. a bundle of hollow fiber membranes positioned in the shell and extending through the tube sheets, said membranes having a predetermined separation factor for one fluid with respect to another fluid;

d. said bundle of hollow fiber membranes having both ends open for feeding a mixture of said fluids under pressure into the bores of said hollow fiber membranes at a first end to contact the inner surfaces of said membranes to allow said one fluid to permeate the membranes to the exteriors thereof;

e. said shell having an outlet for the permeate fluid; and f. said membranes each having a portion adapted to allow more of said fluid mixture to pass through said portion to the exteriors of the fibers, said portion being of sufficient length that the amount of said mixture passing through said portion is sufficient to sweep the permeated one fluid from the exterior of said fiber.

* * * * *